(12) United States Patent
Yolken

(10) Patent No.: US 10,672,040 B1
(45) Date of Patent: Jun. 2, 2020

(54) ORDERING OF FILL REQUESTS TO SEND TO ONLINE AD NETWORKS TO FILL AN AD UNIT IN AN ELECTRONIC PUBLISHER APPLICATION WITH AN ONLINE ADVERTISING IMPRESSION

(71) Applicant: Twitter, Inc., San Francisco, CA (US)

(72) Inventor: Benjamin Henry Yolken, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 621 days.

(21) Appl. No.: 14/727,806

(22) Filed: Jun. 1, 2015

Related U.S. Application Data

(60) Provisional application No. 62/005,797, filed on May 30, 2014.

(51) Int. Cl.
  *G06Q 30/00* (2012.01)
  *G06Q 30/02* (2012.01)

(52) U.S. Cl.
  CPC ..... *G06Q 30/0277* (2013.01); *G06Q 30/0246* (2013.01); *G06Q 30/0275* (2013.01)

(58) Field of Classification Search
  None
  See application file for complete search history.

(56) References Cited

U.S. PATENT DOCUMENTS

| | | | | |
|---|---|---|---|---|
| 2008/0275753 A1* | 11/2008 | Protheroe | ............... | G06Q 30/02 705/14.69 |
| 2010/0106556 A1* | 4/2010 | Vee | ........................ | G06Q 10/04 705/7.22 |
| 2010/0131352 A1* | 5/2010 | Malhotra | ............... | G06Q 30/02 705/14.42 |
| 2011/0106622 A1* | 5/2011 | Kuhlman | ............... | G06Q 30/02 705/14.53 |
| 2012/0166292 A1* | 6/2012 | Bax | .................... | G06Q 30/0241 705/14.71 |

FOREIGN PATENT DOCUMENTS

| | | | | |
|---|---|---|---|---|
| JP | 2010211248 A | * | 9/2010 | ............. G06Q 30/02 |
| WO | WO-2009158643 A1 | * | 12/2009 | ......... H04L 67/1057 |
| WO | WO-2010142118 A1 | * | 12/2010 | ....... H04N 21/25875 |

OTHER PUBLICATIONS

Zedo, Inc. (Roy de Souza). Ad Server FAQs. (Jul. 2, 2013). Retrieved online Jan. 8, 2020. https://www.zedo.com/what-is-ad-server/ (Year: 2013).*
Springborn et al. Impression Fraud in On-line Advertising via Pay-Per-View Networks. (Aug. 14-16, 2013). Retrieved online Jan. 8, 2020. https://www.usenix.org/system/files/conference/usenixsecurity13/sec13-paper_springborn.pdf (Year: 2013).*
Johnston, Michael. CPM vs CPC vs CPA: How to Sell Display Ads. (Jun. 13, 2013). Retrieved online Jan. 8, 2020. https://monetizepros.com/display-advertising/how-to-sell-display-ads-cpm-vs-cpc-vs-cpa/ (Year: 2013).*

* cited by examiner

*Primary Examiner* — James A Reagan
(74) *Attorney, Agent, or Firm* — Smith Baluch LLP

(57) ABSTRACT

In general, embodiments of the invention relate to servicing fill request using ad networks and demand-side partners.

33 Claims, 4 Drawing Sheets

US 10,672,040 B1

ORDERING OF FILL REQUESTS TO SEND TO ONLINE AD NETWORKS TO FILL AN AD UNIT IN AN ELECTRONIC PUBLISHER APPLICATION WITH AN ONLINE ADVERTISING IMPRESSION

CROSS-REFERENCE TO RELATED APPLICATIONS

Pursuant to 35 U.S.C. § 119(e), this application claims benefit of U.S. Provisional Application No. 62/005,797 filed on May 30, 2014, entitled "METHOD AND SYSTEM FOR ADVERTISEMENT OPTIMIZATION." The disclosure of the U.S. Provisional Application is incorporated herein by reference in its entirety.

BACKGROUND

An increasing number of companies, agencies, individuals, and other parties (collectively "advertisers") use online advertising to promote their products and services. An advertiser purchases advertising space from an individual publisher, an advertising network, or an advertising exchange that distributes advertisements to one or more publishers. A publisher may display advertisements in several formats depending on the platform the publisher uses to interface with the consuming public. In many existing approaches, publishers enter into arrangements with advertising networks without knowing the amount of revenue they can expect to receive in consideration. Consequently, many publishers earn less income from their applications than they would otherwise.

SUMMARY

In general, in one aspect, the invention relates to a system for fill request processing, comprising: a data repository comprising a plurality of ad network credentials and a plurality of metrics, a network reporter is coupled to the data repository and programmed to: obtain the plurality of network credentials from a plurality of publishers, store the plurality of network credentials, connect, over a network, to a plurality of ad networks, authenticate, after connecting, to the plurality of ad networks using the plurality of network credentials, obtain, after authenticating, the plurality of metrics from the plurality of ad networks using the plurality of credentials, store the plurality of metrics in the data repository; and an optimizer coupled to the data repository and the plurality of publishers and programmed to generate a first ordering of ad networks for a first application associated with one of the plurality of publishers using at least a portion of the plurality of metrics, wherein the first ordering specifies an order in which the first application should send fill requests to the plurality of ad networks, and provide, over the network, the first ordering to the first application.

In general, in one aspect, the invention relates to a system for fill request processing, comprising a data repository comprising a plurality of ad network credentials and a plurality of metrics, a network reporter is coupled to the data repository and programmed to: obtain the plurality of network credentials from a plurality of publishers, store the plurality of network credentials, connect, over a network, to a plurality of ad networks, authenticate, after connecting, to the plurality of ad networks using the plurality of network credentials, obtain, after authenticating, the plurality of metrics from the plurality of ad networks using the plurality of credentials, store the plurality of metrics in the data repository, and an optimizer coupled to the data repository and the plurality of publishers and programmed to: receive, from an application, a fill request for an ad unit in the application of a publisher, determine an estimated publisher revenue for a first ad network of a plurality of ad networks for filling the ad unit using the plurality of metrics, generate a proxy bid based on the estimated publisher revenue, obtain a winning bid from an ad exchange module, and service the fill request based on the winning bid, an ad exchange module coupled to the optimizer and programmed to: obtain the proxy bid from the optimizer, obtain, using network communication, a bid from a demand-side platform (DSP) for filing the ad unit, and perform a real-time auction for the request using at least the first proxy bid and the bid from the DSP in order to determine the winning bid.

DETAILED DESCRIPTION

Figure 1:
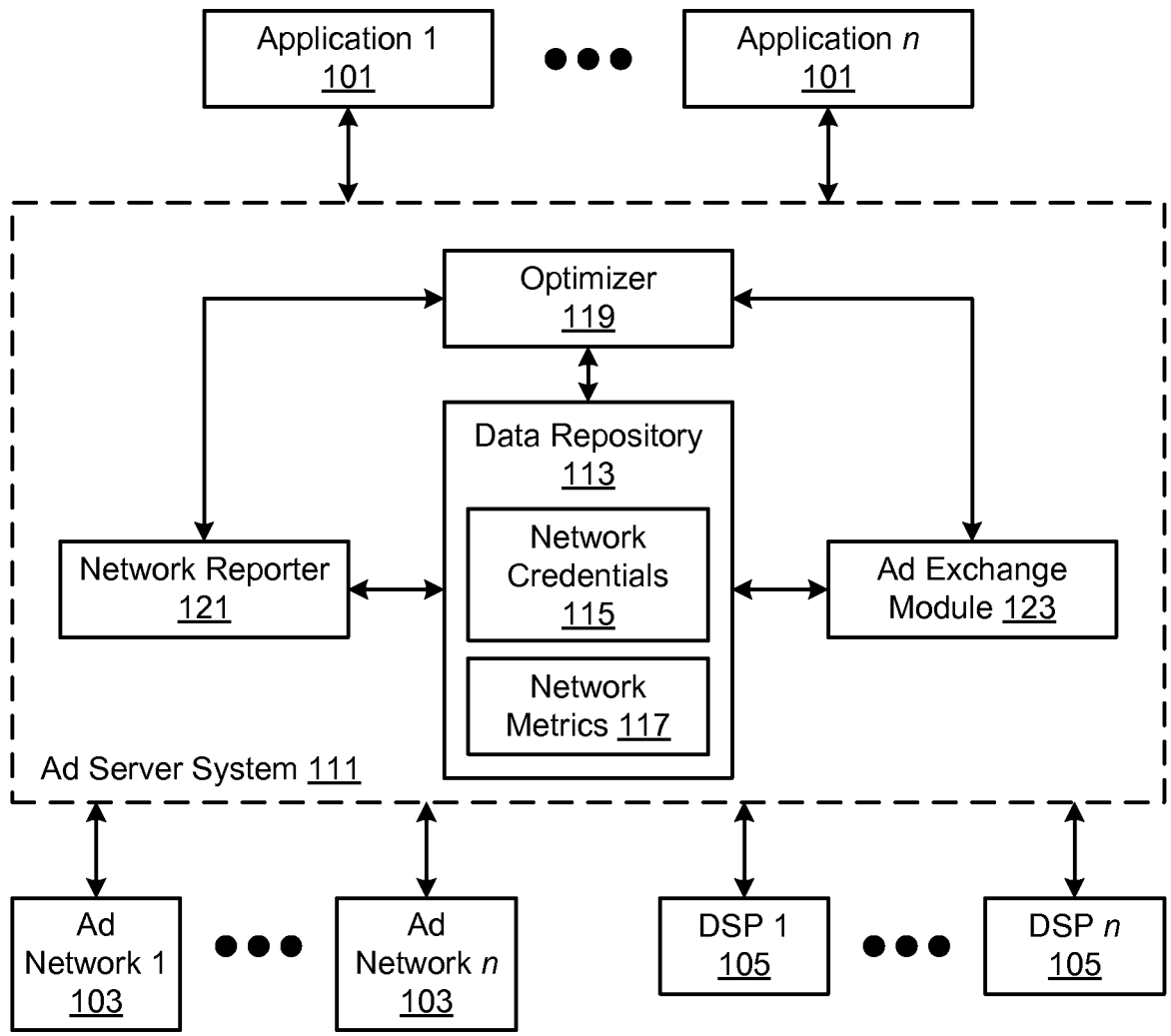
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, according to one or more embodiments of the invention, an advertising server ("ad server") system may optimize the order in which advertising networks ("ad networks" or "networks") or other providers of advertising content are requested to serve impressions to fill an ad unit in a publisher's application. In one embodiment of the invention, optimization of an ad network request order may result in an increase in a publisher's revenue by estimating, e.g., cost-per-impression (i.e., cost to fill the publisher's ad unit) for each ad network. In one or more embodiments of the invention, a model for computing effective cost-per-impression is generated based on a variety of metrics, corresponding to the individual publisher and/or aggregate publishers. The metrics may be obtained directly from the ad networks and/or from other sources. The order for sending ad unit fill requests to the networks (also referred to as a "waterfall"), is optimized and requests may be sent iteratively to the networks down the waterfall until a network serves an impression either to the ad server system or directly to the application. Results of a particular optimization may be reported to the publisher and used as input for future optimization models and/or advertisement exchange ("ad exchange") processes. Although the below description focuses primarily on optimizing revenue from ad networks, the following system, methods, and computer-readable media are relevant to general-purpose internet marketing applications involving multiple types of services and entities.

FIG. 1 shows a system in accordance with one or more embodiments of the invention. As shown in FIG. 1, the system (100) may have multiple components including one or more applications (101), one or more ad networks (103), one or more demand-side platforms (105), and an ad server system (111) including a data repository (113) storing network credentials (115) and network metrics (117), an optimizer (119), a network reporter (121), and an ad exchange module (123). Each of these components is described below.

In one or more embodiments of the invention, an application(s) (101) is a software application of any type configured to execute on any device (e.g., desktop computers, mobile devices). The application is developed and/or owned by a publisher and is implemented to include one or more ad unit(s). An ad unit is a predefined space in an application used to display one or more advertisements, or "impressions." The advertisement may be a native advertisement or a traditional advertisement.

An ad unit may be configured to display impressions in, for example, text, image, and/or video format. An ad unit may be implemented with properties that constrain the number and type of advertisements that may be displayed within the application (101). For example, an ad unit may be configured to display impressions having a specific format (e.g., banner ads, pop-up ads, pop-under ads, floating ads, expanding ads, interstitial ads, or text ads). As another example, an ad unit in a mobile application may have width and length requirements to ensure that any impression served to the application will fit appropriately within the confines of the mobile device screen. The invention is not limited to the aforementioned examples.

In one or more embodiments of the invention, an application (101) may be configured to communicate with external entities including, without limitation, ad networks (103), ad servers, ad exchanges, and/or the ad server system (111). These entities are described in further detail below. An application may communicate with an external entity using an application programming interface (API) and/or any other method of communication known in the art. As an example, an ad network's API provides a set of specifications for receiving requests from and serving impressions to ad servers. Accordingly, an application may be implemented to make requests to fill ad units ("fill requests") formatted according to one or more entities' respective APIs.

In one or more embodiments of the invention, an ad network(s) (103) is service that connects advertisers to publishers of applications. One function of an ad network is matching publishers' ad unit supply with advertiser demand.

In one or more embodiments of the invention, an ad network (103) may charge the advertiser using one of several metrics, including online marketing Key Performance Indicators (KPIs) such as, but not limited to, cost-per-click (CPC) and cost-per-impression (CPM). In a CPC system, an advertiser is charged based on the number of times that users click on an advertisement; in other words, an advertiser is not charged when a publisher displays an advertisement to a user unless the user clicks on the advertisement. In a CPM system, an advertiser is charged based on the number of times a publisher displays its advertisement to a user.

In one or more embodiments of the invention, an ad network (103) may be configured to communicate with external entities including, without limitation, applications (101), servers, ad exchanges, and/or the ad server system (111).

In the case of servers, an ad network may use a publisher or third-party server (typically a combination of web server and database server) to store advertisers' impressions and deliver them to applications upon request. The servers may be configured to perform a variety of other functions including metric tracking (e.g., number of clicks and number of impressions served) and report generation, both for publishers and for advertisers.

Publisher servers may be run by a single publisher and serve ads to that publisher's applications, allowing fine-grained creative, formatting, and content control by that publisher. Third-party servers may serve ads across domains owned by multiple publishers and deliver the ads from a central source to facilitate advertiser and publisher tracking.

An ad exchange is a platform that allows real-time bidding (RTB) on publishers' ad units by ad networks (103), demand-side platforms (105), and/or individual advertisers. Using an ad exchange, publishers may auction their inventory to the highest bidder through a single interface. However, many ad networks (103) are not configured to utilize ad exchange APIs for real-time bidding and may therefore be excluded from the RTB process.

In one or more embodiments of the invention, demand-side platform(s) ("DSP"s) (105) allow advertisers to manage multiple ad exchange accounts through one interface. By utilizing a DSP, advertisers can manage and optimize their bids based on KPIs. DSPs typically combine similar functionality to ad networks (103) with the ability to make real-time bids using ad exchange APIs.

In one or more embodiments of the invention, the data repository (113) is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments of the invention, the data repository (113) is configured to store network credentials (115), network metrics (117), and/or any other data relevant to internet marketing, advertisement networks, and/or advertisement exchanges. Network credentials (115) include user credentials (e.g., usernames and passwords) used by publishers or third parties to interface with an ad network's services. A publisher's network credentials may be obtained from the publisher directly, or from a publisher's application.

Network metrics (117) may include typical online marketing KPIs and other metrics obtained from publishers, ad networks, and/or other entities, including CPC, CPM, and click-through-rate (CTR) (i.e., number of clicks divided by number of impressions served for a given advertisement). The metrics may include, without limitation, geographic data (e.g., CTR by country), time data (e.g., CTR by hour), platform data (e.g., CTR by operating system), and ad unit data (e.g., CTR by ad type).

In one or more embodiments of the invention, the ad server system (111) is configured to communicate with applications (101), ad networks (103), DSPs (105), and/or other entities in order to facilitate serving impressions to applications in response to fill requests. The ad server system may also include functionality typically provided by servers in general and as already described. The ad server system may include functionality to receive, store, and deliver impressions to applications and publisher servers. The ad server system may include functionality to track KPIs or other metrics for publishers and generate related reports. The ad server system may also include functionality to request data from and store data to the data repository (113).

In one or more embodiments of the invention, the optimizer (119) may include functionality to receive fill requests from applications and publisher servers. The optimizer may include functionality to send received fill requests to ad networks and/or other entities.

In one or more embodiments of the invention, the optimizer may include functionality for generating a model for calculating estimated publisher revenue (e.g., eCPM) from an ad network, in the event the ad network successfully fills the publisher's ad unit with an impression. The model may be generated based on one or more metrics measuring past performance of ad networks with respect to the either the individual publisher or publishers in aggregate. The model may be generated based on: (i) CPM for ad networks that report CPM, (ii) based on a combination of CPC and CTR for ad networks that report CPC, or (iii) based on a combination of (i) and (ii) for hybrid ad networks. The metrics may be obtained from the data repository (113) or directly from the ad networks using the network reporter (121) described below. See also FIG. 2, Step 203. In another embodiment of the invention, the optimizer may obtain the model from another entity within or external to the ad server system (111).

In one or more embodiments of the invention, the optimizer (119) includes functionality to determine an optimal ordering for the waterfall of ad networks based on, for example, the estimated publisher revenue calculated using the above-mentioned model and fill rates (i.e., the probability that a given ad network will respond to a fill request). The ordering may be determined so that ad networks expected to generate more revenue for a particular fill request are prioritized to receive the request. The ordering may also be determined based on additional factors including ad networks' respective fill rates (the rate at which an ad network successfully serves an impression to fill an ad unit), geographic data, time data, platform data, and/or ad unit data.

In one or more embodiments of the invention, the optimizer (119) may be configured to send a particular fill request to the first network in the ordering first. If the first network does not successfully serve an impression in response to the request, the fill request may then be sent to the second network in the ordering, and so on until an ad network responds by serving an impression (to the optimizer (119) or to the publisher directly).

In one or more embodiments of the invention, the network reporter (121) may include functionality to access ad network reporting information through the networks' respective APIs, websites, and/or other methods of communication. A given ad network's reporting information may include one or more KPIs or any other metric for measuring the ad network's performance history. In the case of web access, the network reporter may be configured to scrape an ad network's website to obtain the desired metrics. The network reporter may include functionality to obtain credentials from publishers and/or other entities used to access the ad networks. The network reporter may additionally store credentials in and obtain credentials from the data repository (113). In one embodiment of the invention, the network reporter obtains the aforementioned information from each of the ad networks by: connecting to the ad network, authenticating with the ad network using the aforementioned credentials (also referred to as ad network credentials), and, after successful authentication (i.e., the network reporting is able to access information in the ad network), obtaining the information (described above) from the ad network. The authentication may be performed using any known or later discovered mechanism.

In one or more embodiments of the invention, the network reporter (121) may include functionality to generate a report for a publisher based on metrics obtained from the ad networks and/or based on the performance of the optimizer for previously served fill requests.

Figure 2:
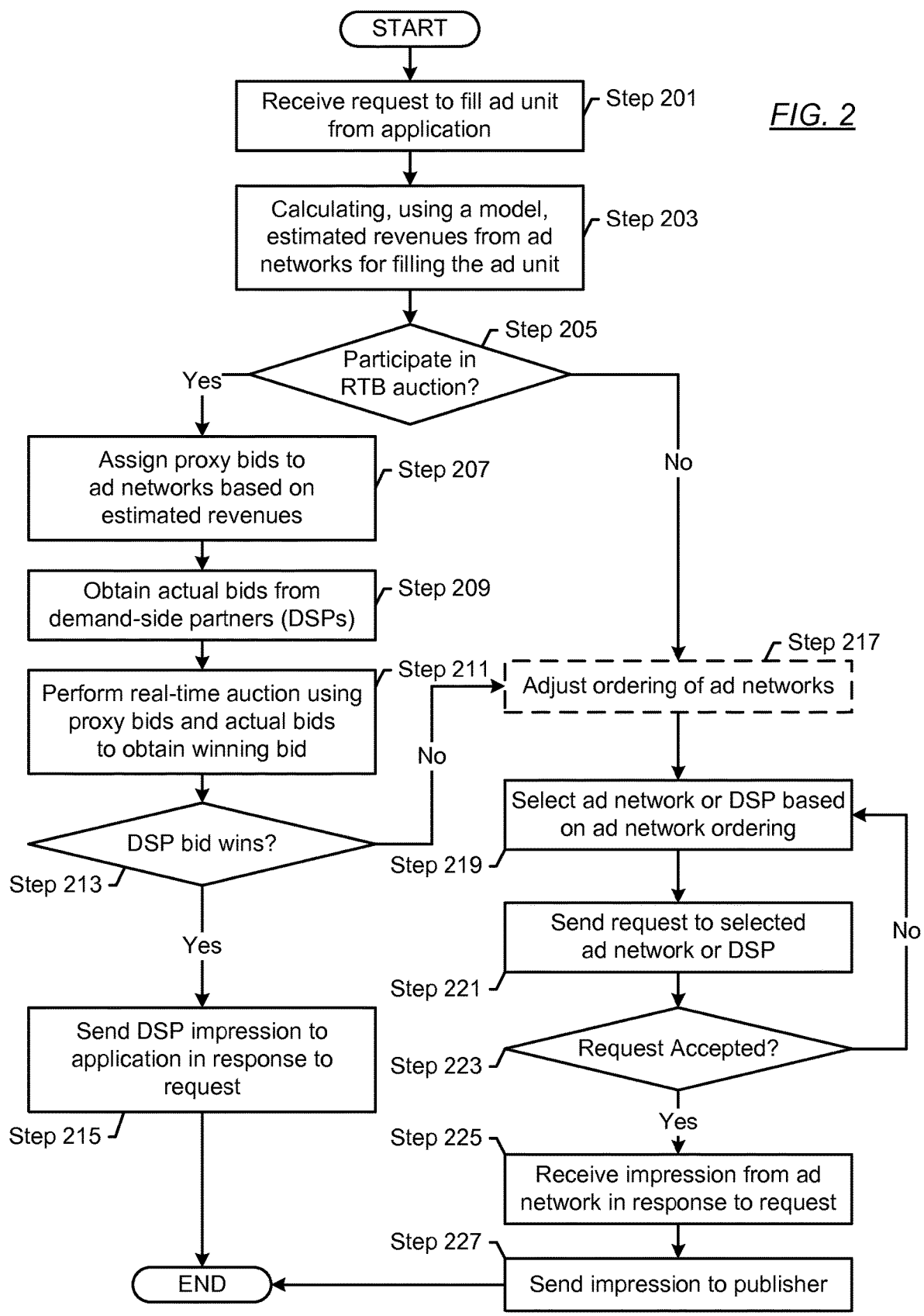
FIG. 2 shows a flowchart in accordance with one or more embodiments of the invention.
Figure 3:
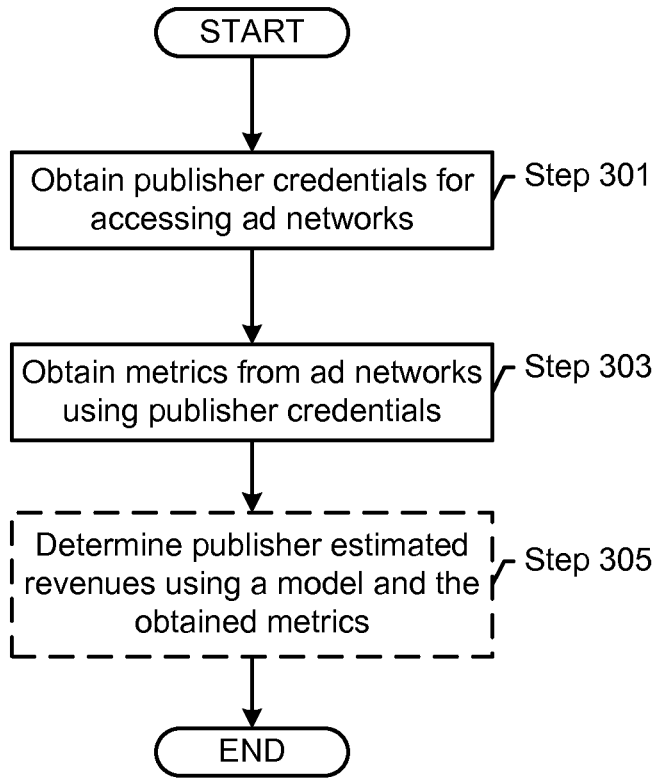
FIG. 3 shows a flowchart in accordance with one or more embodiments of the invention.

The network reporter may obtain the aforementioned metrics in a synchronous manner (e.g., the metrics are obtained as they are generated such that the metrics used in FIGS. 2 and 3 are the most update metrics that are available) or asynchronous manner (e.g., the metrics that are obtain correspond to activity that occurred during some prior time period, e.g., activity that occurred in the prior 24 hours).

In one or more embodiments of the invention, the ad exchange module (123) may include functionality to operate an ad exchange or interface with a third-party ad exchange. The ad exchange module may include functionality to assign proxy bids to one or more ad networks for use in a RTB process (in the case where an ad network is unable to participate in an ad exchange directly). A proxy bid assigned by the ad exchange module to an ad network may be based on the ad network's estimated publisher revenue, calculated by the optimizer using the model. A proxy bid may also be assigned to an ad network using values input directly from the publisher.

The ad exchange module (123) may include functionality to obtain one or more actual bids corresponding to one or more DSPs. The ad exchange module may then perform a RTB auction using, or provide to a third-party ad exchange, proxy bids for ad networks and/or actual bids for DSPs in order to determine the highest bidder for a publisher's fill request.

The ad exchange module may implement generalized second-price auction in order to determine which of the bids or proxy bids is the highest bidder for the publisher's fill request. In another embodiment of the invention, the ad exchange module may implement Vickrey-Clarke-Groves (VCG) auction in order to determine which of the bids or proxy bids is the highest bidder for the publisher's fill request. Other types of auctions may be implemented by the ad exchange module without departing from the invention.

While FIG. 1 shows a configuration of components, other configurations may be used without departing from the scope of the invention. For example, various components may be combined to create a single component. As another example, the functionality performed by a single component may be performed by two or more components. Each of the components shown in FIG. 1 may be implemented using one or more computing systems as described in FIG. 4. Each of the components shown in FIG. 1 may communicate using any combination of wireless or wired connections. Further, the ad networks, DSPs, and applications may communicate with the ad server system via any combination of wired or wireless networks (also referred to as network communication). The aforementioned networks may include the Internet, other wide area networks, and local area networks.

The invention is not limited to the system shown in FIG. 1.

FIGS. 2-3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 2 shows a flowchart for optimizing publisher revenue from one or more ad networks and/or demand-side platforms in accordance with one or more embodiments of the invention. The process shown in FIG. 2 may be used, for example, with the system of FIG. 1 to optimize publishers' ad revenue.

In Step 201, a request to fill an ad unit is received from a publisher's application. The request may include constraints for impressions that are compatible with properties of the ad unit. The request may include, but is not limited to, information about the ad unit (e.g., the dimensions, the type of ad (e.g., banner ad, etc.), type of content that may be shown in the ad unit, etc.), application in which the ad unit resides (i.e., the application that issued the fill request), application type (i.e., the type of application), information about the user of the application, the platform upon which the application is executing (e.g., mobile or desktop, operating system (including version), type of mobile device (i.e., the manufacturer of the phone, etc.)), and the geographic location (e.g., city, state, country, continent, etc.) in which the application has issued the fill request is located.

In Step 203, estimated publisher revenues (e.g., eCPM) from ad networks for filling the ad unit are calculated using a model. The model may be previously generated and obtained from storage or may be generated contemporaneously with the execution of this step.

In one embodiment of the invention, the estimated publisher revenue is determined on a per ad network basis. The information use to determine estimated publisher revenue for a given ad network may be based on: (i) historical information (e.g., CPC, CTR, CPM, etc.) for the application using the ad network; (ii) historical information (e.g., CPC, CTR, CPM, etc.) for other applications using the ad network; and/or fill rate (described below).

In the event that there is no historical information (e.g., CPC, CTR, CPM, etc.) for the application using the ad network (or that there is not sufficient historical information), then the historical information for other applications using the ad network may be used to estimate various KPIs that are subsequently used as input to determine the estimated publisher revenues. For example, one such KPI is CPC. CPC for an application may be estimated by: (i) obtaining the aggregate CPC for a given ad network; (ii) segmenting the aggregate CPC into per-geographic location per-application type segments (e.g., what is the CPC for a given application type in a given country); and (iii) estimating the CPC for an application based on (ii) and geographic information in the fill request. The aforementioned process of taking the aggregate CPC for an ad network (or for a portion of the ad network) and then adjusting the CPC based on the geographic distribution of the application (i.e., the application that made the request) may be referred to as geographic scaling.

Regardless of how the aforementioned historical information is obtained, the historical information is used to determine the estimated publisher revenues on a per ad network basis. More specifically, in one embodiment of the invention, for CPM ad networks (i.e., ad networks that pay publishers based on CPM), the estimated publisher revenue (i.e., eCPM) may be determined using historical CPM information. In one embodiment of the invention, historical CPM may be determined using one or more of the following (listed from most specific to most general): (i) prior CPM determined using ad server system; (ii) network reporting (see FIG. 3) (i.e., average CPM for <application, ad network> as reported by the ad network); (ii) global network reporting (see FIG. 3) (i.e., average CPM for <application type, ad network> for all application as reported by the ad network); (iii) ad unit bid data (i.e., user-entered bid expressed in terms of CPM). In one embodiment of the invention, the most specific historical CPM that is available is used to determine eCPM.

Further, for CPC networks (i.e., ad networks that pay publishers based on the CPC), the estimated publisher revenue may be determined by: (i) obtaining the total impressions and historical CTR for a given network; (ii) determining total clicks using impressions and CTR; (iii) determining CPC for given <ad unit, geographic location> (or obtaining average CPC); (iv) determining total revenue using CPC (from (iii)) and total clicks (from (ii)); (v) determining eCPM by dividing total revenue by total impressions.

In one embodiment of the invention, historical CPC may be determined using one or more of the following (listed from most specific to most general): (i) network reporting (see FIG. 3) (i.e., average CPC for <application, ad network> as reported by the ad network); (ii) global network reporting (see FIG. 3) (i.e., average CPC for <application type, ad network> for all application as reported by the ad network); (iii) ad unit bid data (i.e., user-entered bid expressed in terms of CPC). In one embodiment of the invention, the most specific historical CPC that is available is used to determine eCPM.

In one embodiment of the invention, historical CTR may be determined using one or more of the following (listed from most specific to most general): (i) segment data (i.e., average historical CTR for <ad unit, country, ad network>), (ii) continent data (i.e., average historical CTR for <ad unit, continent, ad network>), (iii) global segment data (i.e., average historical CTR for <application type, type of ad unit, country, ad network>), and (iv) application data (i.e., average historical CTR for <application, country, ad network>). In one embodiment of the invention, the most specific historical CTR that is available is used to determine eCPM.

In one embodiment of the invention, if the network is a hybrid network (i.e., the ad network pays a certain percentage publishers based on CPC and CPM), then the eCPM for hybrid network is determined as follows: (i) determine eCPM for CPM portion of hybrid network, (ii) determine eCPM for CPC portion of hybrid network, (iii) determine final eCPM using following equation: final $eCPM = eCPM_{CPM\_Portion} * CPM\ Portion + eCPM_{CPC\_Portion} (1 - CPM\ Portion)$, where CPM Portion is expressed as a number between 0 and 1.

In one embodiment of the invention, all estimated publisher revenues are expressed in terms of eCPM in order to facilitate comparison between different bids (see e.g., Step 211) and/or for ordering purposes (see e.g., Step 217).

While the invention has been described with respect to eCPM, the estimated publisher revenues may be expressed using another KPI, e.g., eCPC, without departing from the invention.

In one embodiment of the invention, the historical information used to determine estimated publisher revenues may be adjusted to take into account specific context of the fill request. For example, for CPC ad networks, historical CTR information may be used to determine eCPM (as described above). However, the historical CTR information may be adjusted to take into account how many ads have already been shown to a user of an application in a given session. This information, in combination with historical trends that model CTR variance as function of <ad network, number of ads shown in a single session>, may be used to determine an adjusted CTR. The adjusted CTR may then be used to determine an eCPM (as discussed above). For example, if five ads have already been shown to in an application to a specific user in a single session, then the CTR for the sixth ad shown to the user in the aforementioned session may be reduced (or increased) by a certain percentage to take into account the fact that the user has already seen five ads in the aforementioned session. The above adjustment to the CTR may be referred to as a session depth scaling factor.

The historical CTR information may also be adjusted to account for variances in reporting by the ad networks or DSPs (see FIG. 3) and information that the ad server system is able to ascertain about the historical CTR. In one embodiment of the invention, the ad server system includes at least CTR information segmented on a per-application type per-network basis. In such cases, if the variance between the historical CTR information obtained from an ad network for an application (see e.g., FIG. 3) and the CTR information for the application type for the ad network exceeds a threshold, then the historical CTR information may be adjusted to address the variance. The adjustment may be performed using a CTR adjustment factor, which adjusts the CTR to take into account the aforementioned variance. The adjusted CTR may then be used to determine an eCPM (as discussed above).

In Step 205, a determination is made about whether to perform a RTB auction for the ad unit using an ad exchange. If the ad unit is to be auctioned, the process proceeds to Step 207. If the ad unit is not to be auctioned, the process proceeds to Step 217. This determination may be made based on publisher input (i.e., the publisher may "opt in" to RTB auctions). Other factors may be used to make the determination in step 205 without departing from the invention.

In Step 207, if it has been determined that the ad unit is to be auctioned, a proxy bid is assigned to participating ad networks based on the estimated revenue from each ad network for filling the ad unit, calculated according to Step 203. In one or more embodiments of the invention, proxy bids are only assigned to ad networks that lack capability to participate directly in the ad exchange. In one or more embodiments of the invention, proxy bids are assigned to every ad network having an account for the publisher. In one embodiment of the invention, the proxy bids are expressed in terms of eCPM.

In Step 209, actual bids on the ad unit are obtained from one or more DSPs. In one embodiment of the invention, Step 209 includes sending fill requests to one or more DSPs (using, e.g., APIs exposed by the DSPs) and receiving, in response to the fill requests, one or more actual bids. The bids obtained from the one or more DSPs are expressed in the same terms as (e.g., eCPM) as the proxy bids.

In Step 211, an RTB auction is performed using the proxy bids assigned to the ad networks and the actual bids obtained from the DSPs, and a winning bid is obtained. The winning bid may or may not represent the actual revenue received by the publisher, regardless of whether the winner successfully serves an impression to the application in response to the fill request. In one embodiment of the invention, the bids (actual and proxy) are ordered from highest to lowest, e.g., based on the eCPM. The winning bid may correspond to the highest ordered bid. If the RTB is implementing a second-price auction, then the eCPM associated with the winning bid is the eCPM of the second highest order bid. A variety of auction mechanisms can be used to determine a winning bid (e.g., second-price auction), in accordance with various embodiments.

Continuing with the discussion of FIG. 2, in Step 213, it is determined whether the winning bid belongs to a DSP. If a DSP wins the auction, the process proceeds to Step 215. If a DSP does not win the auction (e.g., the winning bid is a proxy bid for an ad network), the process proceeds to Step 217.

In Step 215, the winning DSP's impression is sent to the application or publisher server in response to the fill request received in Step 201, and the process proceeds to end. The impression may be obtained from the DSP or may be obtained from storage if it has already been acquired by the ad server system.

In Step 217, then the ordering of ad networks and the highest non-winning DSP is optionally adjusted. More specifically, the ordering of the bids from the auction in step 211 are used to determine an ordering of ad networks and the highest non-winning bid from the DSP. In one embodiment of the invention, if the values of the proxy bids take into account the fill rates then the ordering may not be adjusted in step 217. However, if the values of the proxy bids did not take into account fill rate, then the ordering of ad networks may be determined using one or more of the following metrics: (i) ordering based on which ad networks provided the highest eCPM based on the geographic location specified in the fill request; (ii) ordering based on which ad networks provided the highest eCPM based on the platform specified in the fill request; and (iii) ordering based on which ad networks provided the highest eCPM based on the type of ad unit (e.g., native, banner ads, etc.) specified in the fill request. In another embodiment of the invention, the ordering may be determined based, at least in part, on eCPM and fill rates for the ad networks.

If a RTB auction has been performed, the ordering of ad networks may be based on the eCPM without taking into account fill rates.

In one embodiment of the invention, if a proxy bid wins the auction (as determined in Step 213), the ad network with which the proxy bid is associated may or may not be the actual ad network that ultimately provides an ad (or impression) in response to the fill request.

The following is an example of step 217. The example is not intended to limit the scope of the invention. Consider a scenario in which the result of the auction in step 211 is: Proxy Bid 1, Proxy Bid 2, DSP 1, Proxy Bid 3, and DSP 2. Then the ordering that result from may be Ad Network 1 (associated with Proxy Bid 1), Ad network 2 (associated with Proxy Bid 2), and DSP 1 (associated with DSP 1). However, if Ad Network 1 has a very low fill rate, then the order may be Proxy Bid 2 (associated with Proxy Bid 2), DSP 1 bid (associated with DSP 1), and Proxy Bid 1 (associated with Proxy Bid 1). In such scenarios, the ordering of the ad networks relative to the highest non-winning DSP (as determined by the auction in step 211) may be determined as follows: (i) calculating an updated estimated publisher revenue for each of the ad networks taking into account fill rates for the ad networks; (ii) calculating a publisher revenue for highest non-winning DSP based on the auction results from step 211; and (iii) ordering the ad networks and the highest non-winning DSP based on the results from (i) and (ii).

In one embodiment of the invention, the ordering resulting from Step 217 may only include the highest non-winning DSP and any ad networks that have a higher estimated publisher revenue then the publisher revenue associated with the highest non-winning DSP.

Continuing with the discussion of step 217, in one embodiment if the result of the optional adjustment of the ordering of the ad networks and the highest non-winning DSP results in the DSP being in the highest ordered position (e.g., in the first position), then the method proceeds to step 215.

If the ordering of the ad networks and the highest non-winning DSP results in an ad network being in the highest ordered position (e.g., in the first position), then the method proceeds to step 219.

Continuing with the discussion of FIG. 2, in Step 219, an ad network (which may or may not be the ad network associated with the winning proxy bid) or highest non-winning DSP is selected to receive a fill request based on the ordering resulting from Step 217.

In Step 221, a fill request is sent to the selected ad network or highest non-winning DSP. The request may include the aforementioned constraints for impressions that are compatible with properties of the ad unit, as well as the aforementioned data regarding the publisher or the application. These constraints may serve to disallow the selected ad network from serving the fill request if the network has no qualifying impressions available.

In Step 223, it is determined whether the fill request is accepted by the ad network or the highest non-winning DSP; in other words, whether the ad network will send an impression in response to the fill request. The ad network may choose not to respond based on the fill request; for example, if the request indicates that the application is published only in the USA, an ad network representing only European advertisers may not respond to the request. If the fill request is not accepted, the process returns to Step 219 to send a fill request to another ad network or the highest non-winning DSP based on the ordering. If the fill request is accepted, the process may proceed to Step 225. Alternatively, Steps 225 and 227 may be skipped in the event the selected ad network sends the impression to the publisher directly, in which case the process proceeds to end.

In Step 225, if the fill request has been accepted by the selected ad network or the highest non-winning DSP, an impression is received from the selected ad network or the highest non-winning DSP in response to the request. In Step 227, the impression is sent to the publisher, and the process proceeds to end.

In one embodiment of the invention, if a DSP does not win the auction in step 211, the highest non-winning DSP may still ultimately service the fill request if (i) the highest non-winning DSP is in the highest ordered position after the ordering is adjusted in step 217 or (ii) higher order ad networks fail to respond to the fill request and the highest non-ordered DSP is ultimately selected to service the fill request. For example, consider a scenario in which the ordering resulting from step 217 is Ad Network 1 (associated with Proxy Bid 1), Ad network 2 (associated with Proxy Bid 2), and DSP 1 bid (associated with DSP 1). In such cases, if Ad network 1 and ad network 2 fail to respond to the fill request, then the fill request may be serviced by DSP 1.

In one embodiment of the invention, if the ad network is a native ad network (i.e., an ad network that serves native ads), then in order to determine whether this ad network will fill the ad request the following steps may occur: (i) ad server system sends an ad fill request to the application (or, more specifically, to an ad server system software development kit (SDK) in the application that is associated with the ad server system); (ii) the ad server system SDK in the application then issues a fill request to a native ads SDK in the application; (iii) the native ads SDK in the application attempts to service the fill request; and (iv) if the native ads SDK is unable to service the fill request, then the native ads SDK sends a response to the ad server system SDK indicating that it did not service the fill request; and (v) the ad server system SDK sends a response to the ad server system indicating that the native ads network did not service the fill request. The ad server system may then proceed to select another ad network or the non-highest DSP to service the fill request.

FIG. 3 shows a flowchart for determining estimated publisher revenue from one or more ad networks. The process shown in FIG. 3 may be used, for example, with the system of FIG. 1 and the method of FIG. 2 (step 203) to build a model for ad revenue estimation.

In Step 301, publisher credentials are obtained for accessing one or more ad networks. The publisher credentials may have been previously obtained by multiple publishers and stored for later retrieval. In one or more embodiments of the invention, when an individual publisher agrees to participate in the ad server system, the participating publisher may "opt in" to provide the publisher's credentials for accessing the ad networks.

In Step 303, metrics are obtained from the one or more ad networks using the publisher credentials. If the participating publisher provides its credentials, metrics for the participating publisher are obtained in addition to metrics for the multiple ad networks. These metrics may include various KPIs and other metrics for previous transactions between the publishers and the ad networks.

In Step 305, estimated publisher revenues may then be determined using a model (see FIG. 2, step 203) and the metrics obtained, and the process proceeds to end.

In one embodiment of the invention, the steps 300 and 303 may occur periodically in order to obtain the metrics information (also referred to as historical information) from the various ad networks and DSPs.

In one embodiment of the invention, step 305 may be performed as part of step 203 in response to a fill request. Alternatively, step 305 may be performed after steps 300 and 303 and the result of step 305 is provided to a user (e.g., a publisher), where the publisher may then modify how it interacts with the various ad networks and/or DSPs. More specifically, the publisher may set an order in which to contact ad networks and/or DSPs in order to service a fill request.

In one embodiment of the invention, the ad server system (or a component therein) may provide a service to publishers based on the method shown in FIG. 3. The service may be referred to as fill request processing service which determines an optimal ordering of fill requests for a given application. More specifically, a publisher may subscribe to the aforementioned service and, in response, the service may periodically provide the publisher (or an application of the publisher) with an optimal ordering for issuing fill requests. This information may be used to manually configure the application or, alternatively, the information may be used to automatically update the order in which the application sends fill requests to the various ad networks. The ordering provided by the service may take into account the aforementioned factors listed above with respect to steps 203 and steps 217 in FIG. 2. Further, the ordering provided by the service may be application specific. Additionally, or alternatively, the ordering may be specific to the application and the geographic distribution of application. For example, there may be an ordering for applications that issue fill requests from the United States of America and a second ordering for the same applications that issue fill requests from Europe.

In one embodiment of the invention, when an application subscribes to the fill request processing service, the application may provide a list of ad networks with which the application is requesting ads. Alternatively, the application may not provide any list of ad networks and, instead, the fill request processing service selects a set of ad networks based on a metric associated with the application and/or the publisher associated with the application. Once the set of ad networks is selected, the fill request processing service may determine an optimal ordering of the set of ad networks as discussed above with respect to FIG. 3.

The following example is for explanatory purposes only and is not intended to limit the scope of the invention. In other words, the following example is an example of one embodiment of the invention. Other embodiments may exist without departing from the scope of the invention.

Suppose that Paul is a publisher of mobile application, Angry Anteaters that includes a single ad unit configured to display banner ads only. Paul enters into arrangements with ad networks A, B, and C to provide impressions to fill the ad unit, and as a result Paul obtains a username and password for each ad network. For a period of time, Paul allows the ad networks to serve impressions to his application directly. During this time, each ad network tracks metrics measuring the number of impressions served to Paul's application, the cost to the network for each impression served (CPM), and/or the cost to the network for each impression clicked by a user (CPC), among other values. Later, Paul creates an account with the ad server system and provides his ad network credentials to the ad server system.

Ursula plays Angry Anteaters regularly. Ursula runs the application on her mobile device, and a request is received by the ad server system for an impression to be displayed on Ursula's mobile device. A model is generated for ad networks A, B, and C. Ad networks A and B are CPM-based ad networks, and ad network C is a CPC-based ad network. The model is used to estimate ad network A's eCPM and ad network B's eCPM based on the networks' respective reported CPMs for previously served impressions, obtained using Paul's credentials. Ad network C's eCPM is estimated based on network C's reported CPC and CTR for previously served impressions.

Because Paul has opted into real-time bidding, a RTB auction is performed using the ad server system's ad exchange. Proxy bids based on the eCPM for each network are assigned to that network, and actual bids for a number of DSPs are obtained. It is determined that ad network A wins the auction. Ad network B comes in second place.

Thereafter, an optimal ordering for the ad networks is determined based on eCPMs and fill rates. Although ad network A's eCPM is higher than ad network B's eCPM, ad network B has a much higher fill rate according to data obtained from the networks using multiple publishers' credentials. Accordingly, the ad network ordering is set at B, A, and C.

Network B is selected because it is first in the ordering and the fill request is sent to ad network B. The fill request indicates that Angry Anteaters requires a banner ad, and at the time of the request, network B possesses no banner ad impressions to serve. Consequently, network B does not respond to the request. Accordingly, network A is selected as network A is second in the ordering. The fill request is sent to ad network A, and in response, a banner ad impression is received from ad network A. Finally, the impression is served to the publisher, and Ursula sees the impression within Angry Anteaters.

Figure 4:
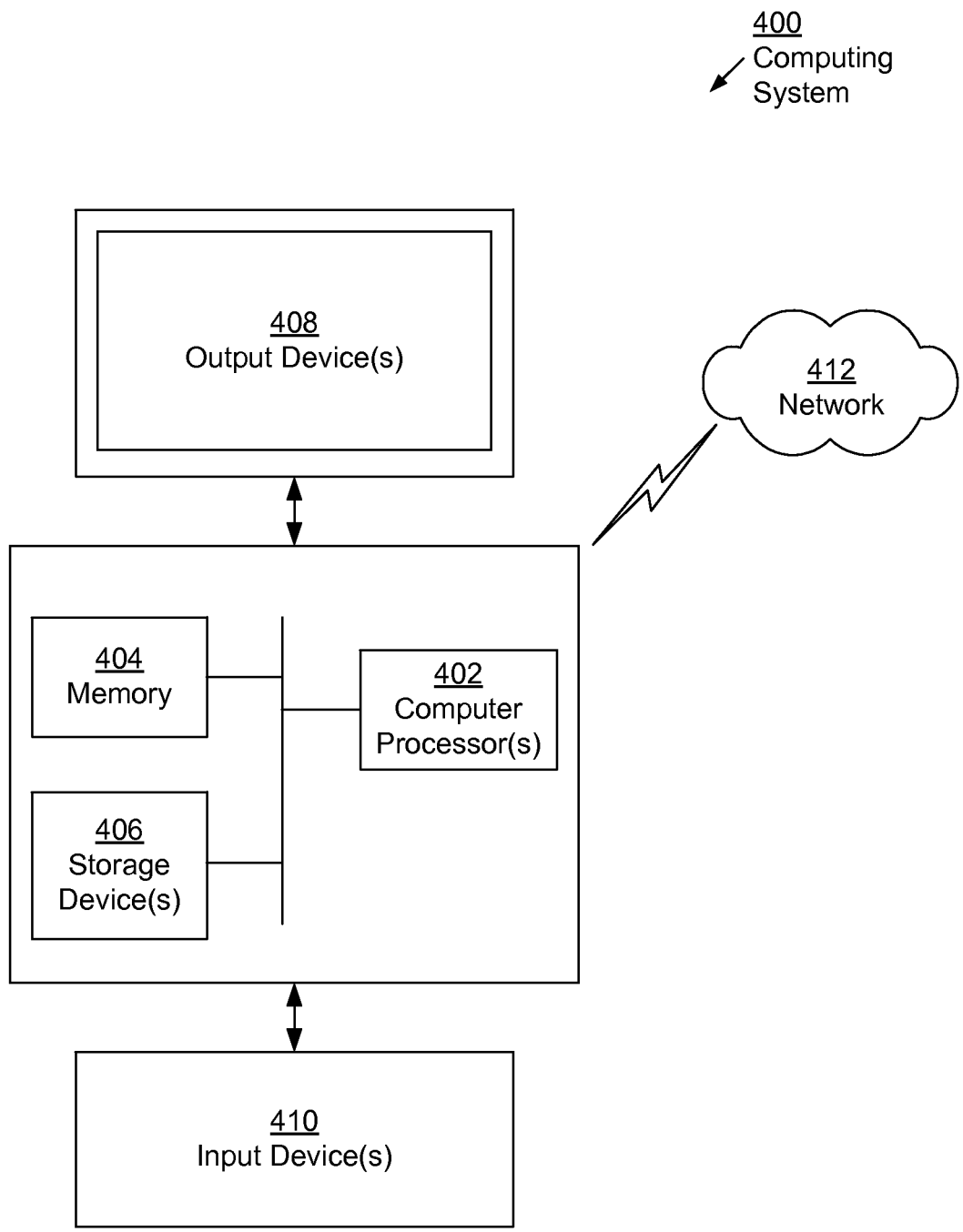
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412).

Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An ad server system for fill request processing to serve online advertising impressions in response to online advertising fill requests transmitted via the Internet from a plurality of electronic publisher applications, wherein for each application of the plurality of electronic publisher applications, a fill request is transmitted while the application is being used by a user in a session on a user computing system coupled to the Internet, and an online advertising impression is received by the user computing system via the Internet in response to the fill request and displayed to the user during the session in an ad unit of the application, the ad unit comprising a predefined space of the application in which to display the received online advertising impression to the user on a screen of the user computing system, the online advertising impression being provided by one ad network of a plurality of ad networks, the ad server system comprising:

a computer processor;

a network interface connection to communicatively couple the ad server system to the Internet; and a memory to store a plurality of publisher ad network credentials, a plurality of ad network metrics, and instructions that are executable by the computer processor to cause the ad server system to:

obtain, via the network interface connection and from the Internet, the plurality of publisher ad network credentials from respective publishers of the plurality of electronic publisher applications, wherein the plurality of publisher ad network credentials allows the respective publishers and the ad server system to access the plurality of ad networks via the Internet;

store the plurality of publisher ad network credentials in the memory;

connect, over the Internet, respectively to the plurality of ad networks;

after connecting respectively to the plurality of ad networks, respectively authenticate the ad server system to the plurality of ad networks using the plurality of publisher ad network credentials;

obtain, via the network interface connection over the Internet and after authenticating, the plurality of ad network metrics from the plurality of ad networks using the plurality of publisher ad network credentials;

store the plurality of ad network metrics in the memory; and generate a first ordering of ad networks for a first application of the plurality of electronic publisher applications using at least a first portion of the plurality of ad network metrics, wherein the first ordering specifies a first order in which the first application or the ad server system transmits a first fill request to the plurality of ad networks until a first ad network of the plurality of ad networks serves a first online advertising impression, in response to the first fill request, to be displayed to a first user in a first ad unit of the first application being used on a first user computer system.

2. The system of claim 1, wherein the instructions are further executable by the computer processor to cause the ad server system to:

generate a second ordering of ad networks for a second application of the plurality of electronic publisher applications using at least a second portion of the plurality of metrics, wherein the first ordering and the second ordering are different.

3. The system of claim 1, wherein the instructions are further executable by the computer processor to cause the ad server system to:

obtain, via the network interface connection over the Internet, a plurality of updated metrics from at least one ad network of the plurality of ad networks using at least some of the plurality of publisher ad network credentials; and generate a third ordering of ad networks for the first application using at least a portion of the plurality of updated metrics.

4. The system of claim 1, wherein the plurality of ad network metrics comprises at least one selected from a group consisting of a cardinality of ads served by at least one of the plurality ad networks, costs-per-impression for at least one of the plurality ad networks, costs-per-click for at least one of the plurality ad networks, and click-through rates for at least one of the plurality of ad networks.

5. The system of claim 4, wherein at least one of the plurality of ad network metrics is segmented based on one selected from a group consisting of geographic location, platform, ad unit, and application type.

6. The system of claim 1, wherein the instructions executable by the computer processor to cause the ad server system to generate the first ordering of ad networks for the first application comprise instructions executable by the computer processor to cause the ad server system to:

determine an estimated publisher revenue for at least two ad networks of the plurality of ad networks; and generate the first ordering based, at least in part, on the estimate publisher revenue for the at least two ad networks of the plurality of ad networks.

7. The system of claim 6, wherein the instructions executable by the computer processor to cause the ad server system to determine the estimated publisher revenue for the at least two ad networks of the plurality of ad networks comprise instructions executable by the computer processor to cause the ad server system to:

obtain a click-through rate (CTR) for a first ad network of the at least two ad networks;

obtain a cost-per-click (CPC) for the first ad network; and determine a first estimated publisher revenue for the first ad network using the CTR for the first ad network and the CPC for the first ad network.

8. The system of claim 7, wherein the instructions are further executable by the computer processor to cause the ad server system to:

modify the CTR for the first ad network to obtain a modified CTR using at least one selected from a group consisting of a CTR adjustment factor and a session depth scaling factor; and determine the first estimated publisher revenue for the first ad network using the modified CTR.

9. The system of claim 7, wherein the instructions executable by the computer processor to obtain the CTR for the first ad network comprise instructions executable by the computer processor to cause the ad server system to determine the CTR using at least one selected from a group consisting of segment data, continent data, global segment data, and application data associated with the first application.

10. The system of claim 7, wherein the instructions are further executable by the computer processor to cause the ad server system to:

modify the CPC for the first ad network to obtain a modified CPC using geographic scaling; and determine the first estimated publisher revenue for the first ad network using the modified CPC.

11. The system of claim 7, wherein the instructions are further executable by the computer processor to cause the ad server system to determine the CPC for the first ad network using at least one selected from a group consisting of network reporting, global network reporting, and ad unit bid data.

12. The system of claim 6, wherein the instructions executable by the computer processor to determine the estimated publisher revenue for the at least two ad networks of the plurality of ad networks comprise instructions executable by the computer processor to cause the ad server system to:

obtain a cost per-impression (CPM) for a first ad network of the at least two ad networks; and determine a first estimated publisher revenue for the first ad network using the CPM for the first ad network.

13. The system of claim 12, wherein the instructions executable by the computer processor to obtain the CPM for the first ad network comprise instructions executable by the computer processor to cause the ad server system to determine the CPM using at least one selected from a group consisting of network reporting, global network reporting, and ad unit bid data.

14. The system of claim 1, wherein the instructions executable by the computer processor to generate the first ordering of ad networks for the first application comprise instructions executable by the computer processor to cause the ad server system to:

determine an estimated publisher revenue for at least two ad networks of the plurality of ad networks;

determine respective fill rates for the at least two ad networks; and generate the first ordering based, at least in part, on the estimated publisher revenue and the respective fill rates for the at least two ad networks of the plurality of ad networks.

15. A non-transitory computer readable medium encoded with instructions that, when executed, cause one or more processors to process online advertising fill requests transmitted via the Internet from a plurality of electronic publisher applications, wherein for each application of the plurality of electronic publisher applications, a fill request is transmitted while the application is being used by a user in a session on a user computing system coupled to the Internet, and an online advertising impression is received by the user computing system via the Internet in response to the fill request and displayed to the user during the session in an ad unit of the application, the ad unit comprising a predefined space of the application in which to display the received online advertising impression to the user on a screen of the user computing system, the online advertising impression being provided by one ad network of a plurality of ad networks, wherein the one or more processors:

obtain, via the Internet, a plurality of publisher ad network credentials from respective publishers of the plurality of electronic publisher applications, wherein the plurality of publisher ad network credentials allows the respective publishers and the one or more processors to access the plurality of ad networks via the Internet;

respectively authenticate the one or more processors to the plurality of ad networks using the plurality of publisher ad network credentials;

obtain, via the Internet and after authenticating, a plurality of ad network metrics from the plurality of ad networks using the plurality of publisher ad network credentials; and generate a first ordering of ad networks for a first application of the plurality of electronic publisher applications using at least a first portion of the plurality of ad network metrics, wherein the first ordering specifies a first order in which the first application or the ad server system transmits a first fill request to the plurality of ad networks until a first ad network of the plurality of ad networks serves a first online advertising impression, in response to the first fill request, to be displayed to a first user in a first ad unit of the first application being used on a first user computer system.

16. The non-transitory computer readable medium of claim 15, further comprising instructions that, when executed, cause the one or more processors to:

determine an estimated publisher revenue for at least two ad networks of the plurality of ad networks; and generate the first ordering based, at least in part, on the estimated publisher revenue for the at least two ad networks.

17. The non-transitory computer readable medium of claim 16, wherein the instructions that cause the one or more processors to determine the estimated publisher revenue for the at least two ad networks of the plurality of ad networks comprise instructions that, when executed, cause the one or more processors to:

obtain a click-through rate (CTR) for a first ad network of the at least two ad networks of the plurality of ad networks;

obtain a cost-per-click (CPC) for the first ad network; and determine a first estimated publisher revenue for the first ad network using the CTR for the first ad network and the CPC for the first ad network.

18. The non-transitory computer readable medium of claim 16, wherein the instructions that cause the one or more processors to determine the estimated publisher revenue for the at least two ad networks of the plurality of ad networks comprise instructions that, when executed, cause the one or more processors to:

obtain a cost per-impression (CPM) for a first ad network of the at least two ad networks of the plurality of ad networks; and determine a first estimated publisher revenue for the first ad network using the CPM for the first ad network.

19. The non-transitory computer readable medium of claim 15, wherein the instructions that cause the one or more processors to generate the first ordering of ad networks for the first application using at least a first portion of the plurality of ad network metrics comprise instructions that, when executed, cause the one or more processors to:
  determine an estimated publisher revenue for at least two ad networks of the plurality of ad networks;
  determine respective fill rates for the at least two ad networks; and
  generate the first ordering based, at least in part, on the estimated publisher revenue and the respective fill rates for the at least two ad networks of the plurality of ad networks.

20. A method for fill request processing of online advertising fill requests transmitted via the Internet from a plurality of electronic publisher applications, wherein for each application of the plurality of electronic publisher applications, a fill request is transmitted while the application is being used by a user in a session on a user computing system coupled to the Internet, and an online advertising impression is received by the user computing system via the Internet in response to the fill request and displayed to the user during the session in an ad unit of the application, the ad unit comprising a predefined space of the application in which to display the received online advertising impression to the user on a screen of the user computing system, the online advertising impression being provided by one ad network of a plurality of ad networks, the method comprising:
  obtaining, via the Internet, a plurality of publisher ad network credentials from respective publishers of the plurality of electronic publisher applications, wherein the plurality of publisher ad network credentials allows the respective publishers to access the plurality of ad networks via the Internet;
  obtaining, via the Internet, a plurality of ad network metrics from the plurality of ad networks using the plurality of publisher ad network credentials; and
  generating a first ordering of ad networks for a first application of the plurality of electronic publisher applications using at least a first portion of the plurality of ad network metrics, wherein the first ordering specifies a first order in which the first application or the ad server system transmits a first fill request to the plurality of ad networks until a first ad network of the plurality of ad networks serves a first online advertising impression, in response to the first fill request, to be displayed to a first user in a first ad unit of the first application being used on a first user computer system.

21. The method of claim 20, further comprising:
  generating a second ordering of ad networks for a second application of the plurality of electronic publisher applications using at least a second portion of the plurality of metrics,
  wherein the first ordering and the second ordering are different.

22. The method of claim 20, further comprising:
  obtaining a plurality of updated metrics from at least one ad network of the plurality of ad networks using the plurality of publisher ad network credentials; and
  generating a third ordering of ad networks for the first application using at least a portion of the plurality of updated metrics.

23. The method of claim 20, wherein the plurality of ad network metrics comprises at least one selected from a group consisting of a cardinality of ads served by at least one of the plurality ad networks, costs-per-impression for at least one of the plurality ad networks, costs-per-click for at least one of the plurality ad networks, and click-through rates for at least one of the plurality of ad networks.

24. The method of 23, wherein at least one of the plurality of ad network metrics is segmented based on one selected from a group consisting of geographic location, platform, ad unit, and application type.

25. The method of claim 20, wherein generating the first ordering of ad networks for the first application comprises:
  determining an estimated publisher revenue for at least two ad networks of the plurality of ad networks; and
  generate the first ordering based, at least in part, on the estimated publisher revenue for the at least two ad networks of the plurality of ad networks.

26. The method of claim 25, wherein determining the estimated publisher revenue for the at least two ad networks of the plurality of ad networks comprises:
  obtaining a click-through rate (CTR) for a first ad network of the at least two ad networks;
  obtaining a cost-per-click (CPC) for the first ad network; and
  determining a first estimated publisher revenue for the first ad network using the CTR for the first ad network and the CPC for the first ad network.

27. The method of claim 26, further comprising:
  modifying the CTR for the first ad network to obtaining a modified CTR using at least one selected from a group consisting of a CTR adjustment factor and a session depth scaling factor; and
  determining the first estimated publisher revenue for the first ad network using the modified CTR.

28. The method of claim 26, wherein obtaining the CTR for the first ad network comprises determining the CTR using at least one selected from a group consisting of segment data, continent data, global segment data, and application data associated with the first application.

29. The method of claim 26, further comprising:
  modifying the CPC for the first ad network to obtaining a modified CPC using geographic scaling; and
  determining the first estimated publisher revenue for the first ad network using the modified CPC.

30. The method of claim 26, further comprising determining the CPC for the first ad network using at least one selected from a group consisting of network reporting, global network reporting, and ad unit bid data.

31. The method of claim 25, wherein determining the estimated publisher revenue for the at least two ad networks of the plurality of ad networks comprises:
  obtaining a cost per-impression (CPM) for first ad network of the at least two ad networks of the plurality of ad networks; and
  determining a first estimated publisher revenue for the first ad network using the CPM for the first ad network.

32. The method of claim 31, wherein obtaining the CPM for the first ad network comprises determining the CPM for the first ad network using at least one selected from a group consisting of network reporting, global network reporting, and ad unit bid data.

33. The method of claim 20, wherein generating the first ordering of ad networks for the first application comprises:
  determining an estimated publisher revenue for at least two ad networks of the plurality of ad networks;
  determining respective fill rates for the at least two ad networks of the plurality of ad networks; and
  generating the first ordering based, at least in part, on the estimated publisher revenue and the respective fill rates for the at least two ad networks of the plurality of ad networks.

* * * * *